United States Patent
Ayachitula et al.

(10) Patent No.: US 8,626,888 B2
(45) Date of Patent: Jan. 7, 2014

(54) DYNAMIC CONTROL OF AUTONOMIC MANAGEMENT OF A DATA CENTER

(75) Inventors: Naga A. Ayachitula, Elmsford, NY (US); Vijaya Jas, Austin, TX (US); Kenneth David Christiance, Cary, NC (US); Peter M. Jensen, Sherwood, OR (US); Josephine E. Justin, Bangalore (IN); Robert Larsen, Hawthorn Woods, IL (US); Ann M. Moyer, Woodstock, NY (US); Lisa Nayak, Austin, TX (US); Rajeev Puri, Charlotte, NC (US); Cheranellore Vasudevan, Austin, TX (US); Chetna Dnyandeo Warade, Athens, GA (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/606,271

(22) Filed: Oct. 27, 2009

(65) Prior Publication Data

US 2011/0099258 A1  Apr. 28, 2011

(51) Int. Cl.
*G06F 15/173* (2006.01)

(52) U.S. Cl.
USPC .......................................... 709/223; 709/226

(58) Field of Classification Search
USPC .................. 709/220, 223, 224, 226
See application file for complete search history.

(56) References Cited

U.S. PATENT DOCUMENTS

| | | | |
|---|---|---|---|
| 6,801,992 B2 | 10/2004 | Gajjar et al. | |
| 7,395,320 B2 | 7/2008 | Hunt et al. | |
| 2005/0256947 A1 | 11/2005 | Devarakonda et al. | |
| 2006/0161879 A1* | 7/2006 | Lubrecht et al. | 717/101 |
| 2007/0067435 A1* | 3/2007 | Landis et al. | 709/224 |
| 2008/0134176 A1* | 6/2008 | Fitzgerald et al. | 718/1 |

FOREIGN PATENT DOCUMENTS

| | | |
|---|---|---|
| WO | 2006/084785 | 8/2006 |
| WO | 2008/054999 | 5/2008 |

* cited by examiner

*Primary Examiner* — Peling Shaw
(74) *Attorney, Agent, or Firm* — Lieberman & Brandsdorfer, LLC

(57) ABSTRACT

A method, system, and article for autonomizing autonomic management of a data center, with the data center having at least one computer system and an associated component. Data is collected from the data center and used as input to identify a data center policy. A set of capabilities of elements of the data center are detected and cataloged based upon the collected data. At least one policy is dynamically selected from at least one set of master policies in a policy directory with the selected policy to support the cataloged capabilities of the data center, and to dynamically control selective application and to adapt parameters for quality of service. The selected policy is applied to manage the data center.

20 Claims, 3 Drawing Sheets

DYNAMIC CONTROL OF AUTONOMIC MANAGEMENT OF A DATA CENTER

BACKGROUND OF THE INVENTION

1. Technical Field

This invention relates to management of a data center. More specifically, the invention relates to assessing the operating parameters of a data center, and autonomic selection and implementation of one or more policies for management of the data center.

2. Description of the Prior Art

It is recognized that computer data centers are managed according to guidelines as established and managed by a system administrator. The need to manage data centers extends beyond the administration of individual software environments, as such data centers frequently integrate several heterogeneous environments into corporate-wide computing systems.

An autonomic computing system is a tool that enables the data center to manage itself with objectives established by the system administrator. The essence of autonomic computing is self-management, with the intent to free system administrators from details of system operation and maintenance. In general, autonomic systems configure themselves automatically in accordance with high-level policies representing objectives.

In an autonomic computing system, autonomic elements manage their internal behavior and their relationships with other autonomic elements in accordance with policies that administrators or others elements have established. An autonomic element will typically consist of one or more managed elements coupled with a single autonomic manager that controls and represents them. In one embodiment, the managed element may be in the form of a product in a non-autonomic system, although it can be adapted to be controlled and managed by the autonomic manager. More specifically, the managed element may be a hardware resource, such as storage, a processor, a printer, a software resource, etc. The autonomic manager distinguishes the autonomic element from its non-autonomic counter-part. By monitoring the managed element and its external environment, and constructing and executing plans based on an analysis of this information, the autonomic manager will relieve system administrators of the responsibility of directly managing the managed element(s).

However, there are limitations associated with the prior art tools for managing data centers. More specifically, the prior art is limited to rules that are configured for specific data centers. Based upon this limitation, the rules need to be updated by a system administrator for different data centers based upon the tools available at the specific data center. Accordingly, there is a need for a self-adapting policy management system for a data center that further reduces the role of the system administrator.

SUMMARY OF THE INVENTION

This invention comprises a method, system, and article for autonomic management of a data center.

In one aspect of the invention, a system is provided with a data center having at least one computer system and an associated component, and more specifically with a tool to autonomically manage the data center. The tool is provided with a discovery module to collect data from the data center. The collected data is then employed as input to identify a data center policy in the form of a selection policy and/or an adaptation policy. The discovery module detects and catalogs capabilities of elements of the data center based upon the collected data. The tool is also provided with a policy adaptation rule to dynamically select one or more of the policies, from a policy directory, wherein the selected policy supports the cataloged capabilities of the data center. In addition, a manager is provided in communication with the tool, with the functionality of the manager to apply at least one of the selected policies to manage the data center.

In another aspect of the invention, a computer implemented method is provided for autonomic management of a data center, with the data center housing at least one computer system and an associated component. Data is collection from the data center, and used as input for identifying a data center policy, including a selection policy and/or an adaptation policy. A set of capabilities of elements of the data center are detected and cataloged from the collected data. Thereafter, at least one policy from a policy directory that supports the cataloged capabilities of the data center is dynamically selected. At least one selected policy is applied to manage the data center.

In yet another aspect of the invention, an article is provided with a data center to house at least one computer system and an associated component. The article also includes a computer-readable carrier including computer program instructions configured to autonomically manage the data center. Instructions are provided to collect data from the data center, and to identify a data center policy in the form of a selection policy or an adaptation policy. In addition, instructions are provided to detect and catalog a set of capabilities of elements of the data center from the collected data, and to dynamically select at least one policy from a policy directory. The select policy should support the cataloged capabilities of the data center. Instructions are also provided to apply the selected policy to manage the data center.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
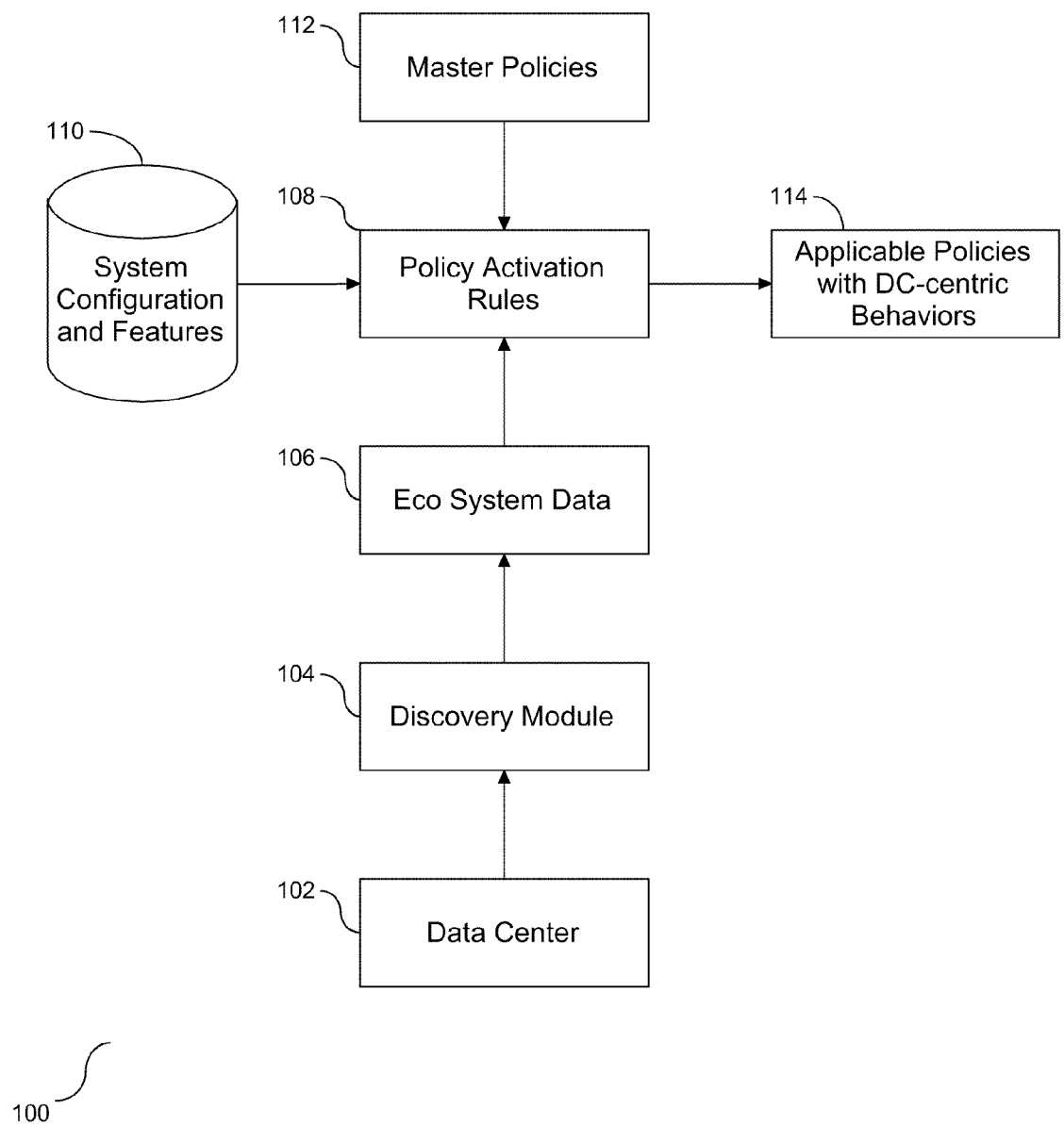
FIG. 1 is a flow diagram of the functional components according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as tools, modules, and managers. The functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A method and system are provided to autonomize dynamic adaptation of the policy behavior of a data center based upon the features supported by the physical components of the data center. More specifically, policy behavior adaptation is based upon one or more levels of automation, available types of data, and the tools of the data center. A discovery tool is employed to gather data pertaining to available avenues for policy execution. Policy rules modify the way the policy is to be executed at run time based upon the specific data center the policy is managing. Accordingly, the policy behavior adaptation together with the policy rule modification eliminates the need to rewrite management rules when the functionality and/or the physical modules of the data center change.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

The level of automation and applicable policies of a data center vary among different data centers. More specifically, the automation and policies of the data center are different based upon the tools and resources available at the specific data center. The tools and resources available may vary from time to time based upon current tasks, priorities, and/or the health and status of hardware and software modules. In one embodiment, the policies for each data center are configured to ensure that the data of the specific data center is operating at a level to provide optimal performance. More specifically, if a particular automation tool is not available, the policy rules should take appropriate action to take the action at the right level. At the same time, if a sophisticated tool is available, autonomic operations are employed to the lowest granular level of action available.

FIG. 1 is a flow diagram (100) illustrating the components employed to determine applicable policies for autonomic operation of a data center. As such, a discovery module (104) is provided in communication with a data center (102). More specifically, the discovery module (104) identifies the specific capabilities of the hardware and software modules that may impact policy execution. In one embodiment, a hardware capability may include the availabilities of a sleep mode or a hibernation mode for a central processing unit in the data center. The discovery module also provides notification of a current dynamic state of the data center, including a policy breach. In one embodiment, the discovery module may re-instate the element affected by the policy breach as part of the breach detection. The specific capabilities of the data center components as discovered by the discovery module (104) will dictate the policies that will be executed for autonomic management of the data center (102). Accordingly, the discovery module (104) detects and catalogs one or more sets of capabilities of the data center.

The data detected by the discovery module is outputted in the flow system (106), and is used as input for the policy activation rules (108). There are actually three factors that are employed as input to the policy activation rules (108), including the discovered data center capabilities (106), the features and configuration of the data center (110) and a set of master operational policies retained in a policy directory for one or more data centers (112). In one embodiment, the features and configuration of the data center (110) is a database having a model upon which policy activation rules for the data center are stored. Similarly, in one embodiment, the policy adaptation rules is a set of domain specific rules that relate the system configuration and its associated functions to the policies. In one embodiment, a particular resource may only subscribe to certain policies. Not all policies in the master directory will apply to every resource in the data center. Based upon the input from the three sources (106), (110), and (112), one or more applicable policies with data center centric behavior(s) is selected (114). In one embodiment, the selection at step (114) is a file output based upon the intersection of the data from the three input sources. Accordingly, one or more set of policies for system administration of the data center is selected based upon a set of master policies retained in the policy directory as well as the specific configuration and capabilities of the data center being evaluated.

As reflected in FIG. 1, policy adaptation rules are employed to select one or more applicable policies for administration of the data center. In one embodiment, each policy adaptation rule representation has meta data tags with each tag to represent a set of pre-requisite metrics and impact, quality of service metrics, and post impact data. The pre-requisite(s) represent a data center function and whether or not it is present, a data center component and whether or not it is present, and a state of the environment. The quality of service attribute(s) include but are not limited to the presence or absence of a specific function, a resolution value, performance numbers, etc. In one embodiment, the quality of service attribute(s) represents that quality of service specified either by the user of the system profile, such as a set of service level requirements typically specified for a particular data center installation. Finally, the post impact attribute pertains to enabling one or more new policies in terms of new functions that may be enabled, additional data that may be available, etc. all of which may be available as a result of enabling another policy. One or more applicable policies are returned for the data center as a set of policies that are relevant to the current state and configuration of the data center.

Figure 2:
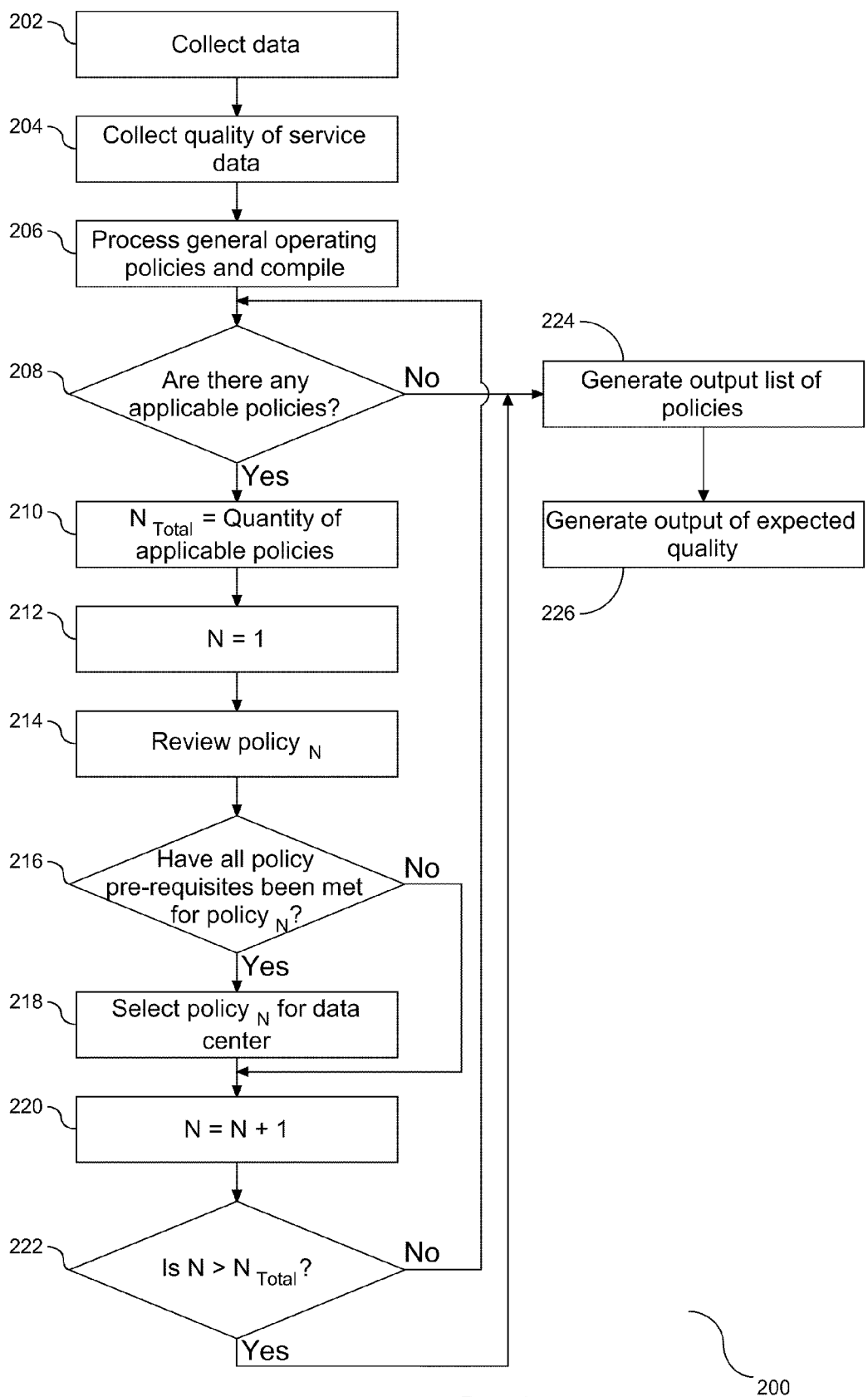
FIG. 2 is a flow chart illustrating review and selection of one or more management policies for the data center.

FIG. 2 is a flow chart (200) illustrating the flow of logic that is employed for selection of policies and rules for autonomic operation of a data center. As shown, system data is collected (202), and quality of service data is also collected (204). System data collected at step (202) pertains to configuration of the subject data center, and quality of service data collected at step (204) pertains to the level of monitoring the data center based upon instrumentation, detectors, sensors, etc. that are available. More specifically, the quality of service data pertains to how accurately variables of the control center can be measured and controlled. Once the data has been collected at steps (202) and (204), the general operating policies for one or more data centers is processed and compiled in a master policy list (206) to select policies appropriate for the subject data center.

As noted above, a policy directory is provided with a set of policies. Different policies may be appropriate for different data centers, based upon their respective configurations and tools. In one embodiment, not all policies in the policy directory are appropriate or relevant for different individual data centers, based upon the configuration of the hardware and software of the individual data centers. Following the collection and processing, it is determined if there are any policies from the selection of policies in the policy directory that may be applicable to the data center based upon the collected data (208). A positive response to the determination at step (208) is followed by an assignment of the quantity of applicable policies from the policy list to be assigned to the variable $N_{Total}$ (210). Each of the applicable policies is then evaluated for selection for management and operation of the data center. A counting variable N is assigned to the integer one (212), and $Policy_N$ in the list of applicable policies is selected for review (214). For $Policy_N$ it is determined if all of the policy pre-requisites have been met (216). More specifically, the determination at step (216) is a pre-condition to determine if the policy representation from the data center has been satisfied so that the subject master policy can function within the parameters of the data center. In one embodiment, a broader application is appropriate where based on certain meta data or meta rules, a subset of master policies is chosen for a specific data center at a specific time. A positive response to the determination at step (216) is following by selecting the master policy for implementation for management of the data center, together with any new functions that may be enabled as a result of enabling the selected policy for the data center (218). Following step (218) or a negative response to the determination at step (216), the variable N is incremented (220), followed by a determination as to whether there are any policies from the list of applicable policies that remain subject to review (222). A negative response to the determination at step (222) is followed by a return to step (208). Conversely, a positive response to the determination at step (222) or following a negative response to the determination at step (208), an output of a list of applicable policies for the data center is generated (224). At the same time, an output of the expected quality of level of monitoring of the data center is generated (226). Accordingly, one or more policies for monitoring the data center are created, together with a set of quality of service parameters for the data center.

Although not shown in FIG. 2, the selection and invocation of data center monitoring policies is conducted at periodic intervals. This enables the policies to adapt to the operation of the data center, and for the data center to adapt to the applicable policies. More specifically, based upon the automation of the policy application, the data center management functions in an autonomic manner.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Figure 3:
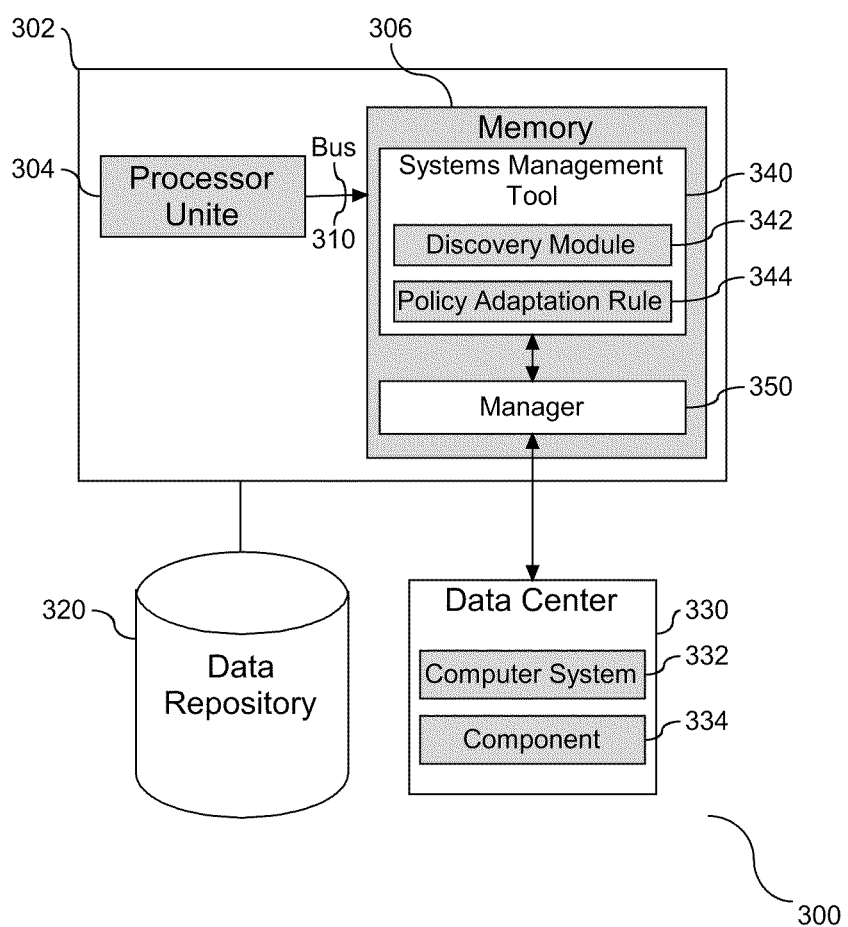
FIG. 3 is a block diagram illustrating a computer system with one or more tools, modules, and managers to support autonomic management of the data center.

FIG. 3 is a block diagram (300) illustrating a computer system with one or more modules to facilitate autonomic management of a data center. The illustration shows a computer system (302) with a processor unit (304) coupled to memory (306) by a bus structure (310). Although only one processor unit is shown, in one embodiment, the computer system (302) may include more processor units in an expanded design. The computer system (302) is in communication with a data repository (320) and a data center (330). In one embodiment, the data center (330) includes at a minimum at least one computer system (332) and at least one associated component (334). A systems management tool (340) is provided local to the system (302) and in communication with the data center (330). The tool (340) provides the functionality for the autonomic operation and management of the data center. More specifically, the tool (340) includes a discovery module (342) to collect data from the data center (330). The collected data is used as input to identify a data center policy, including a selection policy and/or an adaptation policy. The discovery module (342) functions to both detect and catalog a set of capabilities of the elements of the data center (330) as ascertained from the collected data. In addition, the tool (340) includes a policy adaptation rule (344) to dynamically select and/or adapt at least one policy for management of the data center from a set of master policies retained in a policy directory. In one embodiment, the policy adaptation rule is self-adapting in response to a configuration change of the data center. Furthermore, in one embodiment, the policy adaptation rule includes meta data for representation of a pre-requisite metric, a quality of service metric, and a post impact metric, wherein the pre-requisite metric is a service level requirement for the data center, the quality of service metric value represents availability in the data center of a specific function, an associated resolution value, and a performance number, and a post impact metric is a function that may be enabled in the data center and additional data may be available with activation of the subject selected policy. The selected policy should support the capabilities of the data center, as cataloged. In addition, a manger (350) is provided local to the system (302) an in communication with both the data center (330) and the systems management tool (340). The manager (350) applies the selected policy from the list of master policies to manage the data center.

As shown herein, the systems management tool (340), the discovery module (342) and the manager (350) each reside in memory (306) local to the system (302). In one embodiment, the system (302) may be local to the data center (330) or in communication with the data center (330) from a remote location. Similarly, in one embodiment, the tool (340), discovery module (342), and manager (350) may each reside as hardware tools external to memory (306), or they may be implemented as a combination of hardware and software. Similarly, in one embodiment, the tool (340), discovery module (342), and manager (350) may be combined into a single functional item that incorporate the functionality of the separate items. Furthermore, as shown herein, each of the tools (340), discovery module (342), and manager (350) are local to one system (302). However, in one embodiment, they may be collectively or individually distributed across a network and function as a unit to embody the functionality of individual units. Accordingly, the tool (340), discovery module (342), and manager (350) may be implemented as software tools, hardware tools, or a combination of software and hardware tools for managing the functionality of the planner in a distributed manner.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

The tools provided for management of the data center support a self adapting policy management system for a data center through dynamically adapting policy behavior based upon the functionality and operating parameters of the subject data center. The policies are dynamically modified based upon the data center eco system. More specifically, it is another level of dynamic autonomic application with autonomic management that is autonomized. Dynamic adaptation of the policies leads to optimal policy execution and more accurate control of the data center. More specifically, a set of management policies is selected based upon features supported by the components of the data center, level of automation, available types of data, and tools of the data center. The policy meta rules control the quality and resolution of policy management actions for the specific data center. Accordingly, this invention teaches a way of dynamically controlling selective application as well adapting the parameters or quality of service too.

Alternative Embodiments

It will be appreciated that, although specific embodiments of the invention have been described herein for purposes of illustration, various modifications may be made without departing from the spirit and scope of the invention. In particular, the specific application disclosed herein is for data center policy adaptation based on data center eco system. In one embodiment, the basic principle of the data center policy adaptation can be applied to areas of sense-interpret-act scenarios. Examples include, but are not limited to self-adaptation of financial health monitoring and control, dynamic traffic control, dynamic planning, etc. Accordingly, the scope of protection of this invention is limited only by the following claims and their equivalents.

We claim:

1. A system for autonomizing autonomic management of a data center comprising:
   a data center to house at least one computer system and an associated component;
   a systems management tool in communication with the data center, the tool comprising:
     a discovery module in communication with the data center, the discovery module to collect data from the data center as input to identify a data center policy selected from the group consisting of: a selection policy, an adaptation policy, and combinations thereof;

the discovery module to detect and catalog a set of capabilities of elements of the data center from the collected data;

a policy adaptation rule to support iterative policy adjustment for managing the data center to meet a pre-requisite metric, including selection of at least one policy from a policy directory that supports the cataloged capabilities of the data center, wherein the policy for managing the data center is modified based upon changes in configuration of physical modulus of the data center detected by the discovery module and to dynamically control selective application and to adapt parameters for quality of service; and a manager in communication with the systems management tool, the manager to apply the at least one selected policy to manage the data center.

2. The system of claim 1, further comprising the policy adaptation rule being self-adapting responsive to a configuration change of the data center.

3. The system of claim 1, further comprising representation of the policy adaptation rule to contain meta data to represent the pre-requisite metric, a quality of service value, and a post impact metric.

4. The system of claim 1, wherein the pre-requisite metric is a service level requirement for the data center.

5. The system of claim 3, wherein the quality of service value represents presence in the data center of a specific function, an associated resolution value, and a performance number.

6. The system of claim 3, wherein the post impact metric represents a function that may be enabled and additional data that may be available with activation of the selected policy.

7. The method of claim 1, further comprising modifying the policy for managing the data center based upon availability of a resource at the data center, the availability defined by current tasks, priorities, and status of hardware and software modules.

8. The method of claim 1, wherein the changes in configuration of the data center detected by the discovery module include changes in hardware and software.

9. A computer implemented method for autonomic management of a data center, comprising:

the data center housing at least one computer system and an associated component;

collecting data from the data center as input for identifying a data center policy selected from the group consisting of: a selection policy, an adaptation policy, and combinations thereof;

detecting and cataloging a set of capabilities of elements of the data center from the collected data;

iteratively adjusting a policy for managing the data center to meet a pre-requisite metric based upon changes in configuration of physical modulus of the data center detected by the discovery module;

controlling selection of at least one policy from a policy directory that supports the cataloged capabilities of the data center and adapting a parameter for quality of service; and applying the at least one selected policy to manage the data center.

10. The method of claim 9, further comprising the step of dynamically selecting at least one policy from the policy directory being self-adapting responsive to a configuration change of the data center.

11. The method of claim 9, further comprising employing a policy adaptation rule for selection of at least one policy, and the policy adaptation rule containing meta data for representing the pre-requisite metric, a quality of service value, and a post impact metric.

12. The method of claim 9, further comprising the pre-requisite metric being a service level requirement for the data center.

13. The method of claim 11, further comprising the quality of service value representing presence in the data center of a specific function, an associated resolution value, and a performance number.

14. The method of claim 11, further comprising the post impact metric representing a function that may be enabled and additional data that may be available with activation of the selected policy.

15. An article comprising:

a data center to house at least one computer system and an associated component;

a computer-readable carrier including computer program instructions configured to autonomize autonomic management of the data center, the instructions including:

instructions to collect data from the data center as input to identify a data center policy for managing the data center selected from the group consisting of: a selection policy, an adaptation policy, and combinations thereof;

instructions to detect and catalog a set of capabilities of elements of the data center from the collected data;

instructions to iteratively adjust the policy for managing the data center to meet a pre-requisite metric based upon changes in configuration of physical modulus of the data center detected by the discovery module and control selection of at least one policy from a policy directory that supports the cataloged capabilities of the data center, wherein the instructions dynamically control selective application and adaptation of parameters for quality of service; and instructions to apply the at least one selected policy to manage the data center.

16. The article of claim 15, further comprising the instructions to dynamically select at least one policy being self-adapting responsive to a configuration change of the data center.

17. The article of claim 15, further comprising the instructions to dynamically select at least one policy to employ a policy adaptation rule, the rule to contain meta data to represent the pre-requisite metric, a quality of service value, and a post impact metric.

18. The article of claim 15, wherein the pre-requisite metric is a service level requirement for the data center.

19. The article of claim 17, wherein the quality of service value represents presence in the data center of a specific function, an associated resolution value, and a performance number.

20. The article of claim 17, wherein the post impact metric represents a function that may be enabled and additional data that may be available with activation of the selected policy.

* * * * *